United States Patent
Weis et al.

(10) Patent No.: US 12,387,188 B2
(45) Date of Patent: Aug. 12, 2025

(54) SELF-SERVICE TERMINAL AND METHOD

(71) Applicant: Wincor Nixdorf International GmbH, Paderborn (DE)

(72) Inventors: Eduard Weis, Paderborn (DE); Alexander Knobloch, Paderborn (DE); Sebastian Engelnkemper, Langenberg (DE); Jochen Linck, Essen (DE)

(73) Assignee: Wincor Nixdorf International GMBH, Paderborn (DE)

( * ) Notice: Subject to any disclaimer, the term of this patent is extended or adjusted under 35 U.S.C. 154(b) by 0 days.

(21) Appl. No.: 18/650,320

(22) Filed: Apr. 30, 2024

(65) Prior Publication Data
US 2024/0281783 A1 Aug. 22, 2024

Related U.S. Application Data

(63) Continuation of application No. 17/965,048, filed on Oct. 13, 2022, now Pat. No. 12,020,226.

(30) Foreign Application Priority Data

Oct. 18, 2021 (EP) .................................... 21203143

(51) Int. Cl.
*G06F 9/451* (2018.01)
*G06F 3/01* (2006.01)
*G06Q 20/18* (2012.01)
*G06Q 20/20* (2012.01)

(52) U.S. Cl.
CPC ............ *G06Q 20/18* (2013.01); *G06F 3/011* (2013.01); *G06F 9/451* (2018.02); *G06Q 20/208* (2013.01)

(58) Field of Classification Search
CPC ...................................................... G06Q 20/18
See application file for complete search history.

(56) References Cited

U.S. PATENT DOCUMENTS

| | | | |
|---|---|---|---|
| 9,218,723 B2 * | 12/2015 | Alexopoulos | G07F 17/3211 |
| 2010/0180238 A1 * | 7/2010 | Lanfermann | G16Z 99/00 715/865 |
| 2014/0245169 A1 * | 8/2014 | Feng | G06F 21/35 715/745 |
| 2015/0120040 A1 * | 4/2015 | Freedman | G07F 19/202 700/232 |
| 2015/0121283 A1 * | 4/2015 | Kangas | G06F 3/0236 715/773 |
| 2017/0308964 A1 | 10/2017 | Morris et al. | |
| 2018/0024845 A1 * | 1/2018 | Card, II | G06F 3/167 715/719 |

(Continued)

OTHER PUBLICATIONS

Extended European Search Report dated Mar. 14, 2022 filed in the corresponding European application; 8 pages.

*Primary Examiner* — Di Xiao
(74) *Attorney, Agent, or Firm* — Black McCuskey

(57) ABSTRACT

According to various aspects, a self-service terminal (100) may include: a user interface (1008) accessible to a user of the self-service terminal (100); a sensing device (206) configured to sense information about the user; a control device (106) configured to: determine a physiological condition of the user based on the information; select an interface profile from a plurality of predefined (e.g., saved) interface profiles based on the physiological condition; instruct a reconfiguration of the user interface (1008) based on the selected interface profile.

8 Claims, 9 Drawing Sheets

(56) References Cited

U.S. PATENT DOCUMENTS

2020/0302344 A1* 9/2020 Just ......................... G06F 21/34
2020/0372567 A1* 11/2020 Zerfos ................ G06Q 30/0641
2021/0248846 A1* 8/2021 Matzek .................... G07C 5/08

* cited by examiner

SELF-SERVICE TERMINAL AND METHOD

TECHNICAL FIELD

Various aspects relate generally to a self-service terminal and a method.

BACKGROUND

Traditionally, a wide variety of services is offered via so called self-service terminals. As a general concept, the self-service terminal enables the user to request and complete the service autonomously, e.g., without human assistance.

As example, in traditional retail markets, a self-checkout terminal provides the possibility for a customer to scan the desired products by himself (e.g., unassisted) as an alternative to scan the products by a cashier. Such a self-checkout terminal provides for a faster checkout, more anonymity for the customer and less personnel costs for the retail market. By a self-checkout terminal, each customer, rather than the cashier, scans the bar codes of the products to be purchased. Another example is an automated teller machine.

A general challenge of this concept is that the hardware of the self-service terminal, by which the user operates the self-service terminal, has to fulfill multiple criterions to be suitable. One of the criterions includes that the operation concept should be as intuitive as possible. Another of the criterions includes that the interaction should be as convenient and/or ergonomic as possible. However, minimizing the costs of the hardware is another criterion. Put together, conventional hardware is optimized to fulfill the criterions at best for the maximum possible group of persons, e.g., potential customers. Naturally, the resulting configuration fails to fit best for all persons. For example, some persons, such as children or wheelchair users, may be not able to access the full extent of hardware, which is optimized for a standing adult. Conventional concepts that address this gap are cost intensive, not intuitive, and normally directed to only one access problem.

In the example of an automated teller machine, an audio jack may enable a blind person to plug in audio equipment, but may be hard to find without proper vision. Thus, human assistance is still required to provide such options.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
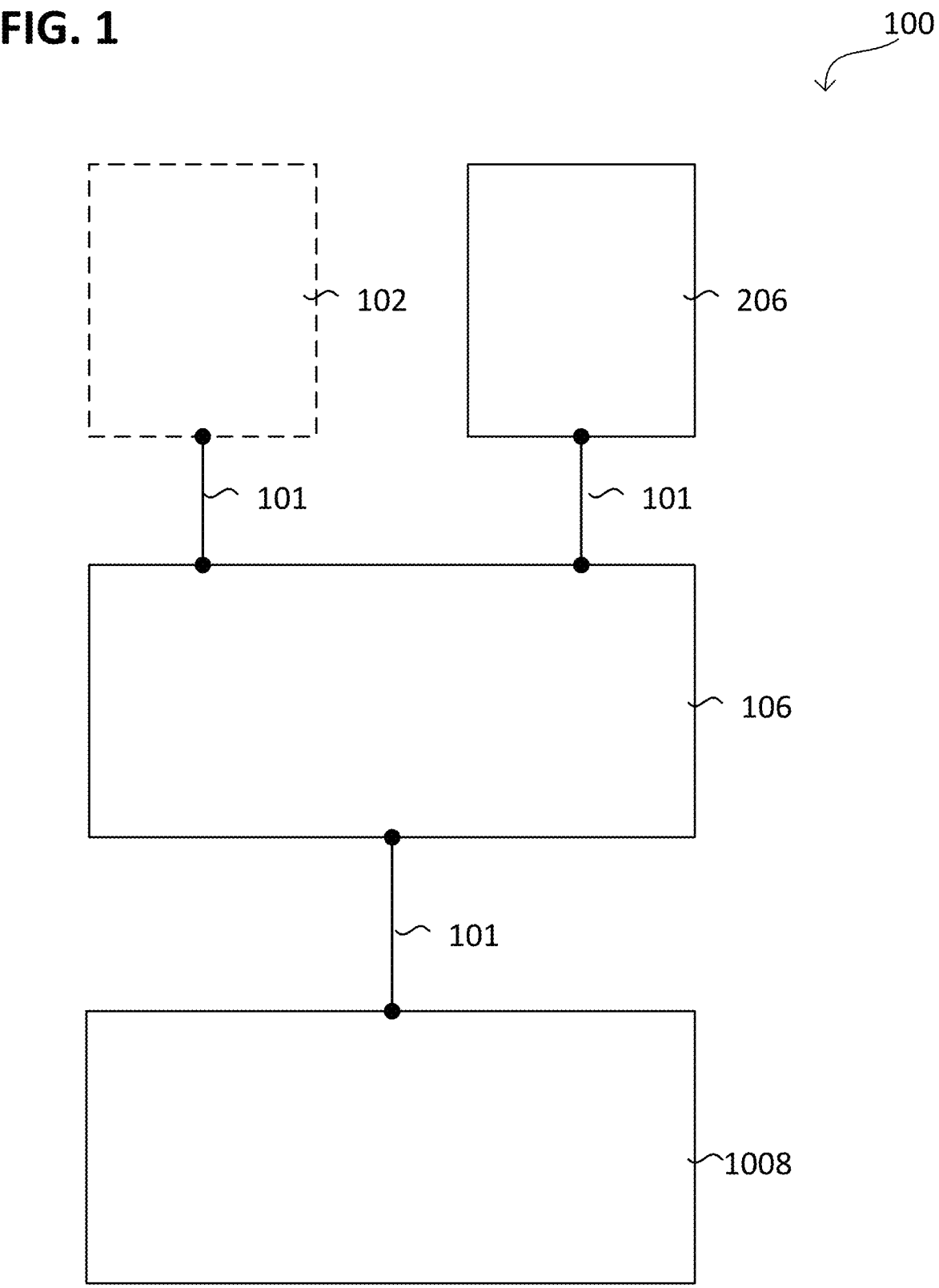
FIG. 1 and FIG. 2 respectively show a self-service terminal according to various aspects in schematic diagrams.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects may be combined with one or more other aspects to form new aspects. Various aspects are described in connection with methods and various aspects are described in connection with devices. However, it may be understood that aspects described in connection with methods may similarly apply to the devices, and vice versa. Throughout the drawings, it should be noted that like reference numbers are used to depict the same or similar elements, features, and structures.

The present disclosure may include various processes (e.g., sequences). The processes may be performed by hardware components or may be embodied in computer-readable instructions, which may be used to cause a general purpose or special purpose processor or other logic circuits programmed with the instructions to perform the processes. Alternatively, the processes may be performed by a combination of hardware and software.

The term "processor" as, for example, used herein may be understood as any kind of entity that allows handling data, signals, as examples. The data, signals, as example, may be handled according to one or more specific functions executed by the processor.

A processor may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), as examples, or any combination thereof. Any other kind of implementation of the respective functions, which will be described below in further detail, may also be understood as a processor or logic circuit. It is understood that any two (or more) of the processors or logic circuits detailed herein may be realized as a single entity with equivalent functionality, and conversely that any single processor or logic circuit detailed herein may be realized as two (or more) separate entities with equivalent functionality. It is understood that one or more of the method steps detailed herein may be performed (e.g., realized) by a processor, may by one or more specific functions executed by the processor.

The term "control device" (also referred as to controller) may be understood as any kind of a logic implementing entity, which may be special purpose circuitry or a processor executing software stored in a memory, firmware, or any combination thereof. Thus, a "control device" may include a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "control device" may, additionally or alternatively, include one or more processors executing software or at least code segments, e.g. any kind of computer program, e.g., a computer program using a virtual machine code such as e.g., Java.

According to various aspects, one or more processes performed by one or more processors may, illustratively as counterpart, be realized by code segments stored in the memory, wherein, the code segments cause, if executed by the one or more processors, the one or more processors to perform the processes (e.g., functions and methods). The code segments, e.g., provided as part of the software, may be updated via a (e.g., mobile) network, e.g., on demand.

The control device may be configured to control one or more components of the self-service terminal, e.g., by instructing the one or more components. The process of instructing may include generating an instruction (e.g., as message) and transmitting the instruction to the component to be controlled. The control device may optionally include a memory, e.g., storing code segments that represent the processes provided by the control device, e.g., the controlling of the one or more operating functions. Additionally or alternatively, the memory may store one or more criterion, rules, and algorithms, as examples, as detailed herein.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of signals, e.g., electrical currents) and logical transmission (e.g., the transmission of digital data over a logical software-level connection). For example, a processor or controller may transmit or receive data over a software-level connection with another processor or controller in the form of signals, where the physical transmission and reception is handled by signal-layer components such as transceivers, and the logical transmission and reception over the software-level connection is performed by the processors or controllers. The term "communicate" encompasses one or both of transmitting and receiving, i.e., unidirectional or bidirectional communication in one or both of the incoming and outgoing directions.

The transmission of any type information (information transmission) may be in accordance with a communication protocol. Generally, the transmission of information may include generating and/or sending a message including the information (e.g., instructions) in accordance with the communication protocol. The communication protocol may indicate an agreement according to which the information is transmitted between two or more components. In the simplest form, the communication protocol may be defined as a set of rules that define the syntax, semantics and synchronization of the transmission. The communication protocol(s) used (e.g. one or more network protocols) may be (but need not to be) configured according to the OSI (Open System Interconnect) reference model. Any protocols can also be used in the respective protocol layers. For example, the transmission of information via a certain type of network may include generating and/or sending a message including the information according to a network communication protocol.

The term "interface profile" may be understood as representing a specific configuration of a user interface. For example, the interface profile may represent the configuration of one or more graphical components of the user interface, the configuration of one or more auditory components of the user interface, and/or the configuration of one or more tactile components of the user interface. For example, the interface profile may represent the configuration of one or more programmable interface components, such as soft keys or other graphical operation elements. A soft key is a button flexibly programmable to invoke any type of function rather than being associated with a single fixed function or a fixed set of functions. Examples of a soft key may include: a screen-labeled function key, a screen displayed function key (e.g., implemented via touch screen).

The user interface may be configured based on the interface profile (also referred as to applying the interface profile to the user interface), e.g. according to the interface profile. The configuration of the user interface may include bringing one or more of the following into conformity with the interface profile (e.g. by changing): the configuration of one or more graphical components of the user interface (e.g., graphical operation elements), the configuration of one or more auditory components of the user interface, and/or the configuration of one or more tactile components of the user interface. For example, the configuration of the user interface may be changed (also referred as reconfigured) by changing the interface profile, which is applied to the user interface.

As an example, changing the configuration of the user interface (also referred as reconfiguring the user interface) may change a soft key (as example for a graphical interface component) in one or more of the following properties: a position (also referred as to rearranging), a size (also referred as to resized), a color, a brightness, and/or a label. For example, a user sitting in a wheelchair may be enabled to access all relevant soft keys by rearranging the relevant soft keys proximate the most bottom position of the user interface (e.g., the touch surface).

A graphical user interface may include multiple layers, among others: a client layer (e.g., including one or more clients), a display processing layer, and a display driver layer (e.g., implemented by the kernel). The display processing layer may include the display server layer and/or the graphical interface layer. The display processing layer connects client layer (e.g., a software application, also referred to as operational application) with the display driver layer. The display processing layer may receive data from one or more clients of the client layer, processes the data, transfers the data to the display driver layer (e.g., being a component of the kernel). The display driver layer writes the data into the framebuffer. The content of the framebuffer is transmitted to the connected display device.

The interface profile may represent a specific configuration on the client layer, the display processing layer, and/or the display driver layer, e.g., a combination thereof. For example, the scaling of a graphical operation element may be defined by the client layer (e.g., within the running software application) and/or by the driver layer (e.g., defining the rendering scale).

Reference will be made to a plurality of predefined interface profiles. Optionally, each interface profile of the plurality of predefined interface profiles may be unique. In other words, the plurality of predefined interface profiles may be free of identical interface profiles, that is, they differ from each other. If multiple users like to use the same interface profile, multiple user information may be allocated to the same interface profile. If necessary, an interface profile may also be duplicated, but changed in the assigned user information, such that the duplicates differ from each other in the user information, to which they are assigned.

In the following reference is made to a self-checkout terminal as exemplarily self-service terminal for demonstrative purposes, which is not intended to be limiting. The self-checkout terminal may be disposed in a retail market. The retail market may include a market area, in which multiple products are stored and presented to be collected by the customer.

One or more self-checkout terminals may be disposed at the exit of the retail market. Once at the self-checkout terminal, the customer scans the bar code of the product being purchased, and puts the product on an optional weighing scale, so that it may be verified that the weight of the product on the scale matches stored weight information for the item scanned, that is, the consistency thereof is determined (also referred as to consistency monitoring). Generally, the consistency monitoring may include comparing two or more pieces of information, which are assumed to correspond to the same product. If the information is consistent, the consistency monitoring may be positive, otherwise a fraudulent activity may be recognized. The two or more pieces of information may include a weight information, product identity, a barcode information, a user input, and the like.

According to various aspects, a self-checkout terminal may be configured to register the products that a customer wants to purchase, e.g. by scanning the products by product scanning device (e.g. a barcode scanner). Furthermore, the self-checkout terminal may include a (e.g. digital) cash register system (e.g. having a self-service cash register or a cashier workstation), which is configured to perform a payment process. The payment process may, for example, include that the customer initiates a financial transaction to pay for the products to be purchased. The cash register system may include one or more of the following components of the user interface: a screen (e.g. a touch-sensitive screen, also referred to as touch screen), a printer (e.g. for printing an invoice and/or a label), a (e.g. programmable) cash register keyboard (may also be part of the touch-sensitive screen), a payment terminal for accepting a medium of financial transaction (e.g. cash or a debit card). The payment terminal may be, for example, an electronic payment terminal (also known as an EC terminal, "EC"- electronic cash, e.g. for reading a debit card and/or a credit card). For example, the self-checkout terminal may include a (e.g. digital) cash register system that is configured to perform one or more cash register processes, such as a registration session. For example, a registration session may include a calculation process, an inventory process, and/or a registration process.

The references made to the self-checkout terminal may analogously apply to other types of the self-service terminals. One or more of the functions, methods and/or aspects performed by the self-checkout terminal may be analogously performed by a self-service terminal. Examples of a self-service terminal include: Automated Teller Machine (ATM), banking terminal, self-service vending machine (e.g., for snacks, alcohol, cigarettes and/or jewelry), self-checkout terminal, self-service gas station, self-service scale, and/or a slot machine.

The following refers to image data and their processing. The image data may be a digital image of reality (e.g. of the detection area) at a point in time at which the image data is acquired. The image of reality may, for example, be produced by a lens that projects light onto the surface of an image acquisition sensor (e.g. a Bayer Sensor). Acquiring the image data may include reading out the image acquisition sensor while the light is projected onto its surface. The image data obtained in this way may initially be in the so-called raw data format (also referred to as RAW), which includes the read-out measurement values of the image acquisition sensor pixel by pixel and/or may be processed as such. The image data may optionally be or be converted into another image format during processing, e.g. into a raster graphic (different from RAW as raster graphic) or a vector graphic, so that their further processing may be based on this image format, or may be converted between them if required. The converting process may optionally include interpolating the measured values of the image acquisition sensor (e.g. by demosaicking), e.g. to obtain complete multi-color color information for each pixel or to use less memory or computing power. The image data may optionally be compressed (e.g. to reduce the memory or processing power requirements) or uncompressed (e.g. to avoid falsification). The respective image format may also define the color space according to which the color information is specified.

An image sensing sensor (also referred to as an image sensor) is of the optical sensor type and may include one or more photoelectrically active regions (also referred to as pixels) which generate and/or modify an electrical signal in response to being exposed to electromagnetic radiation (e.g. light, e.g. visible light). The image sensor may, for example, include a CCD sensor (charge-coupled device sensor) and/or an active pixel sensor (also referred to as a CMOS sensor) or be formed therefrom. Optionally, an image sensor may be configured wavelength sensitive (e.g. to acquire color information), e.g. by several color filters (e.g. in grid form), and thus distinguish between different wavelengths.

In the following, reference is made to the process of sensing information about the user (also referred to as user information). The user information may be sensed based on the image data representing the user and/or representing objects associated with the user, e.g., a document of the user and/or a wheelchair of the user. The information may be determined by processing the image data (also referred to as image processing). Examples of image processing may include object recognition (also referred to as object detection), e.g., such as face recognition. Object recognition refers to the processor-implemented process of detecting instances of semantic objects of a certain class (such as humans, faces, or items) in digital images and videos. Object recognition may include the determination of visible features in the sensed area, e.g. their geometric characteristic (e.g. shape and/or size), relative spatial parameters (e.g. position, distance and/or orientation) and/or their surface texture, or similar. Face recognition may include the determination of the visible features in the area of the frontal head (also referred to as face). Examples of visible features of the face include: eyes, nose, ears, mouth, contours, skin imperfections (such as wrinkles), etc.

In a less complex implementation, objects recognition may be based on a two-dimensional image data, for example to determine spatial parameters (e.g. position, distance, and/or orientation) of the features. To increase the accuracy of the objects recognition, additional parameters may be determined, such as their characteristics and/or texture.

In analogy, objects recognition may be based on three-dimensional image data. Three-dimensional image data may include depth information, for example, which is fed into the objects recognition algorithm. As further example, a face recognition based on a three-dimensional image data may inherently perform a life recognition test.

As a result of objects recognition, a set of features may be obtained that can be stored and/or further processed. Each objects recognition may result in such a set of features, which can be compared with another set of features, for example.

Herein, the term "physiological condition" in the context of a person (e.g., a user of the self-service terminal) refers to a physical condition (also referred to as corporal condition or bodily condition) of the person, e.g., including one or more of the following details about the person: a sensory condition, an anatomical condition, a motoric condition (e.g., motor skill), or a combination thereof. The physiological condition may be, but does not need to be, severe or permanent to be a disability. As an example, the physiological condition may reflect the physiological functional capacity (PFC) of the person, e.g., with respect to the task of operating the self-service terminal. In general, PFC refers to the ability to perform the physical tasks of daily life and the ease with which these tasks can be performed by the person. PFC may decline automatically with advancing age (even in healthy adults) and/or may decline with impairments occurring during the person's lifetime or present from birth of the person. A reduced PFC may result in a reduced capacity to perform certain physical tasks, may result in an increased incidence of functional disability, may result in an increased loss of independence, and the like, and thus may result a reduced ability to operate the self-service terminal.

It may be understood that the references made with respect of the physiological condition (also referred to as physiological condition) of the person (e.g., user of the self-service terminal) are not intended to assume a judgement of the physiological condition, but rather relate to the accessibility of the user interface of the self-service terminal. The configuration of the user interface may be directed to fit best for a certain physiological condition or range of physiological conditions, e.g., a certain body height, visual and/or auditory functionality of the person. Any deviation therefrom may (but not necessarily) increase the difficulty of the interaction between the person and the user interface, e.g., the difficulty to operate the self-service terminal.

References made to a condition for a process or function, e.g., using terms like "if" and "when", may, for example, include that the process or function is carried out in response to the condition (e.g., triggered by the condition).

To address such a deviation, the user interface (UI) of the self-service terminal may be variable in a technical sense, e.g., in terms of size, type of interaction layer, arrangement of UI components, visibility of UI components, and/or position of UI components and the like. For example, the UI of the self-service terminal may be temporally configured to be accessible at best by a user in a sitting position. The UI may be reconfigured, if it is determined that the user of the self-service terminal is a standing person, and vice versa.

As an example, disabled people are often not able to use the standard user interface of a self-service terminal without restrictions. The available operating assistances are often not known to the user and/or hardly accessible to the user, or are not adapted to the specific type of disability. According to various aspects, the UI and the related operation concept of self-service terminal may be reconfigured automatically and specifically adapted to the needs (disability, height) of a user.

According to various aspects, one or more of the following is provided:
- (e.g., automatic) recognition of a need for assistance;
- (e.g., automatic) camera-based recognition of the need for assistance (e.g., based on: recognition of a wheelchair, recognition of the user's height, recognition of the user's behavior, and the like);
- optical reading of a document to determine the need for assistance, e.g. a disabled user's card, a disability certificate, a smartcard (or another document) including information about the user's disability;
- biometric recognition of a user in need of assistance;
- determination of the need for assistance in dialogue (e.g., user input or by employee);
- a reconfiguration of the UI;
- an arrangement of one or more graphical input components of the UI in an accessible area (e.g. at the lower screen area for wheelchair users) of the self-service terminal;
- an adjustment of the appearance (e.g. enlarging click buttons or increasing the image contrast in case of impaired vision);
- an activation of the voice output (e.g. in case of determining a completely blind user);
- an activation of a voice input in case of determining a limited capability of the user to operate the self-service terminal (e.g. in case of amputation); and/or
- a notification of the service personal about the user and/or the need for assistance;

In general, the reconfiguration of the user interface may be implemented by a software application executed by the self-service terminal, e.g., by the control device.

Additionally or alternatively, the reconfiguration of the user interface may include scaling the image on the driver/platform level.

FIG. 1 illustrates a self-service terminal 100 according to various aspects in a schematic diagram.

The self-service terminal 100 may include a user interface 1008. The user interface 1008 may include one or more of the following: a display device (e.g., including a touch screen), one or more microphones, one or more speakers, one or more physical keys (also referred to as buttons or switches). The user interface 1008 may be configured to receive one or more inputs (e.g., information including instructions, approvals, and/or selections) by the user and/or present one or more outputs (e.g., information including prompts, processing results, options, and/or explanations) to the user. As such, the user interface 1008 may provide an interaction with the user, e.g., by mutually exchanging information.

The user interface 1008 (UI) may include of one or more interaction devices, e.g., at least one input device and/or at least one output device. Examples of the interaction devices may include: one or more tactile interaction device (interacting via touch), one or more visual interaction device (interacting via sight), and/or one or more auditory interaction device (interacting via sound, e.g., voice). For example, the visual interaction device may implement one or more graphical user interfaces (also referred to as visual UI or as GUI). The visual interaction device may be optionally be combined with the tactile interaction device to implement a visual/tactile UI. The visual UI may be configured to display graphics, such as one or more graphical operation elements. In analogy, the tactile UI may be configured to receive input from the user by touch and/or pressure. Additionally or alternatively, the tactile UI may implement an interaction via braille. As a more detailed example, an interaction device may include one or more human-machine interface (HMI) devices with at least one physical input device such as one or more keyboards, one or more mice; and/or at least one physical output device such as one or more display devices, one or more speakers, and/or one or more printers.

The self-service terminal 100 may further include a sensing device 206. The sensing device 206 may be configured to sense information about the user (also referred to as user information). Examples of the user information may include: image data based information of the user and/or biometric information of the user. Optionally, the sensing device 206 may be configured to sense one or more other types of information about the user and/or not user-related information.

Examples of biometric information (e.g. on biometric features) include: facial features (e.g. determined on the basis of image data of the face) of the person, a finger line image of the person, a genetic fingerprint of the person, iris features (i.e. features of the iris) of the person, ocular fundus features (i.e. features of the retina) of the person, nail bed pattern of the person, signature features of the person, a voice profile of the person (e.g. enabling speaker authentication), one or more anatomical features of the user. Examples of the one or more one or more anatomical features include: stature, body height (also referred to as height of the person), (e.g., missing) limbs, (e.g., missing) eyes, amputations, prosthetics and the like.

The sensing device 206 may, for example, include an imaging device and/or a document sensing device as exemplarily components. For example, the document may include information about the user's identity and/or physiological condition. Examples of the document may include: a paper based document (e.g., free of electronics) or a smartcard. Examples of the document may include a legal certificate (e.g., issued by the state or government), e.g., a biometric identity card, a driver's license or a disability certificate. Other examples of the document may include a card, e.g., issued by the service provider.

It may be understood that the references made to individual components (e.g., the imaging device and/or a document sensing device) of the self-service terminal 100 may refer to the individual functions provided by each of the components. However, it may be understood that the components may, but do not necessarily have to, be provided by common hardware and/or software. For example, the imaging device and/or a document sensing device may share one or more hardware components, such as sensor(s) and/or processor(s), and/or one or more software components. In other words, at least some functions of one or more components of the self-service terminal 100 may be implemented by the same hardware and/or software.

The self-service terminal 100 may include a control device 106 as further component. The control device 106 may be coupled communicatively with the sensing device 206 and/or the user interface 1008. As such, the control device 106 may communicate with the sensing device 206 and/or the user interface 1008. The communicative coupling 101 may include a network, e.g., a CAN-network, Ethernet network and/or a communication bus, e.g., Universal Serial Bus. The information communicated to the control device 106 may be converted into data (also referred as to input data) for further processing by the control device 106. The information communicated from the sensing device 206 may include sensor data that represents the user information sensed by the sensing device 206. The information communicated from the user interface 1008 may include sensor data that represents an input of the user at the user interface 1008.

The information communicated to the user interface 1008 may include instructions to output information and/or to reconfigure the user interface 1008.

The control device 106 may be configured to determine, based on the information communicated from the sensing device 206, the physiological condition of the user. It may be understood that the physiological condition may be represented by any type of data that is indicative of the physiological condition.

In a first example, the physiological condition may be represented by a plurality of classes (also referred to as classification), e.g., each class representing a type of predetermined physiological condition. For example, a first class may represent a physiological condition, by which the self-service terminal 100 (e.g., the user interface 1008) is fully accessible to the user (this case is also referred to as default case). A second class may represent a physiological condition, by which the self-service terminal 100 (e.g., the user interface 1008) is only partially or not accessible to the user (this case is also referred to as reconfiguration case). The plurality of classes may optionally represent one or more further physiological conditions, if required, e.g., for a more detailed differentiation in the reconfiguration case. For example, one or more classes may represent the obstacle causing that the self-service terminal 100 is only partially or not accessible to the user. Additionally or alternatively, one or more classes may represent a probability that the self-service terminal 100 is only partially or not accessible to the user and/or a grade of the accessibility.

Such a classification enables to reduce the level of detail of the determination of the physiological condition. For example, a certain grade of uncertainty may be acceptable without impairing the classification.

In a second example, the physiological condition may (additionally or alternatively to the classification) represent one or more physiological anomalies of the user. It may be understood that the term "physiological anomaly" refers to the deviation from physiological condition, for which the self-service terminal 100 is optimized in its default configuration, e.g., in terms of size, type of interaction device, arrangement of UI elements and the like, and is not intended to assume a judgement of the physiological condition. Examples of the physiological anomalies may include: no anomaly (e.g., only in the default case), impaired mobility, impaired vision, impaired hearing, usage of a wheelchair, usage of crutches, impaired tactile perception, reduced body height, impaired limbs, partially paralysis, weakness, tremor, and impaired motor skills.

In the following, reference is made to the reconfiguration case and the default case for demonstrative purposes, which is not intended to be limiting. The references made to the reconfiguration case and the default case may also apply to other types of case, e.g., if more than two cases apply, and/or any other type of information representing the determined physiological condition of the user.

The control device 106, the user interface 1008, and/or the sensing device 206 may include a corresponding infrastructure (e.g. processor, storage medium and/or bus system) or the like, which implements a sensing and processing chain (SPC). The SPC may be configured to control the corresponding sensor(s), to process their sensed quantity as input and, based on this, to provide an output representing the result of the measurement.

An exemplarily imaging device may include one or more image sensors and may be configured to provide image data of the user. In this example, the sensing device 206 may be configured to recognize the user, e.g., the presence of the user or an input of the user, and in response, to activate the imaging device to provide image data of the user. For example, the image data may include one or more images of the user, e.g., a video or the like.

An exemplarily document sensing device may be configured to sense one or more (e.g., physical, logical, and/or optical) quantities of the document. Examples of the physical quantity include: a size, a shape, or a contour of the document or a region of the document (e.g., a text or image region). Examples of the optical quantity include: a color, reflectivity, and the like. Examples of the logical quantity include: text, code, pattern, and the like. [0054]

For sensing one or more optical quantities of the document, the document sensing device may include one or more image sensors configured to provide image data of the document. The image data of the document may be processed, e.g., by optical character recognition.

Optionally, the imaging device and the document sensing device may use the same image sensor(s) of the sensing device 206. Thus facilitates the construction.

Another exemplarily document sensing device may include one or more RFID (radio-frequency identification) sensors configured to read RFID-data from the document. Additionally or alternatively, the document sensing device may include a code scanning device (e.g., barcode scanning device) configured to read a machine-readable code (e.g., barcode) from the document. The code scanning device may include respective sensors to implement the code scanning functionality, such as one or more infrared sensor, one or more cameras, and the like. It may be understood that any other type of machine-readable code may be used additionally or alternatively to the barcode.

The RFID sensors may, for example, be configured to communicate by radio waves, e.g., emit radio waves, and/or receive radio waves from a RFID responder (also referred as to tag) of the document. The RFID (radio-frequency identification) sensors may, for example, include a transmitter and the like.

Yet another exemplarily document sensing device may be configured to determine biometric information based on sensing the document. For example, the document may include a biometric indicator. Examples of the biometric indicator may include machine-readable code, text (e.g., including at least on character) or a color. For example, the biometric indicator may indicate at least one of the following: deafness, blindness, partially or completely missing limbs, or the presence of a wheelchair, and the like.

For example, the document may be an official document, such as a certificate of disability. Alternatively, the document may be provided by the operator of the self-service terminal 100. Other types of documents may also be used.

In the Example of the self-service terminal 100 being a self-checkout terminal, the self-service terminal 100 may include a product scanning device 102 that is configured to scan one or more products. Illustratively, the product scanning device 102 may be operated by the customer (also referred as to self-scanning procedure), e.g., by presenting a product to be scanned to the scanning device 102. Thereby, the customer may register each desired product to be bought at the self-service terminal 100. For example, the product scanning device 102 may sense a quantity of each product presented to the product scanning device 102.

For example, the product scanning device 102 may include an optical scanning device, an RFID (radio-frequency identification) scanning device, or the like. The optical scanning device may, as example, include a barcode scanning device or an image scanning device. The barcode scanning device may include respective sensors to implement the scanning functionality, such as one or more infrared sensor, one or more cameras, and the like.

In operation, a product (e.g., a market product) may have an information medium to be scanned by the product scanning device 102, for example, such as a barcode and/or a RFID-tag. The information medium may include product information allocated to the product, e.g., by a product database. For example, the product information may represent a product identifier, a product type, or a product price.

Optionally, the product scanning device 102 and the sensing device 206 may use the same image sensor(s) of the self-service terminal 100. Thus facilitates the construction.

Figure 2:
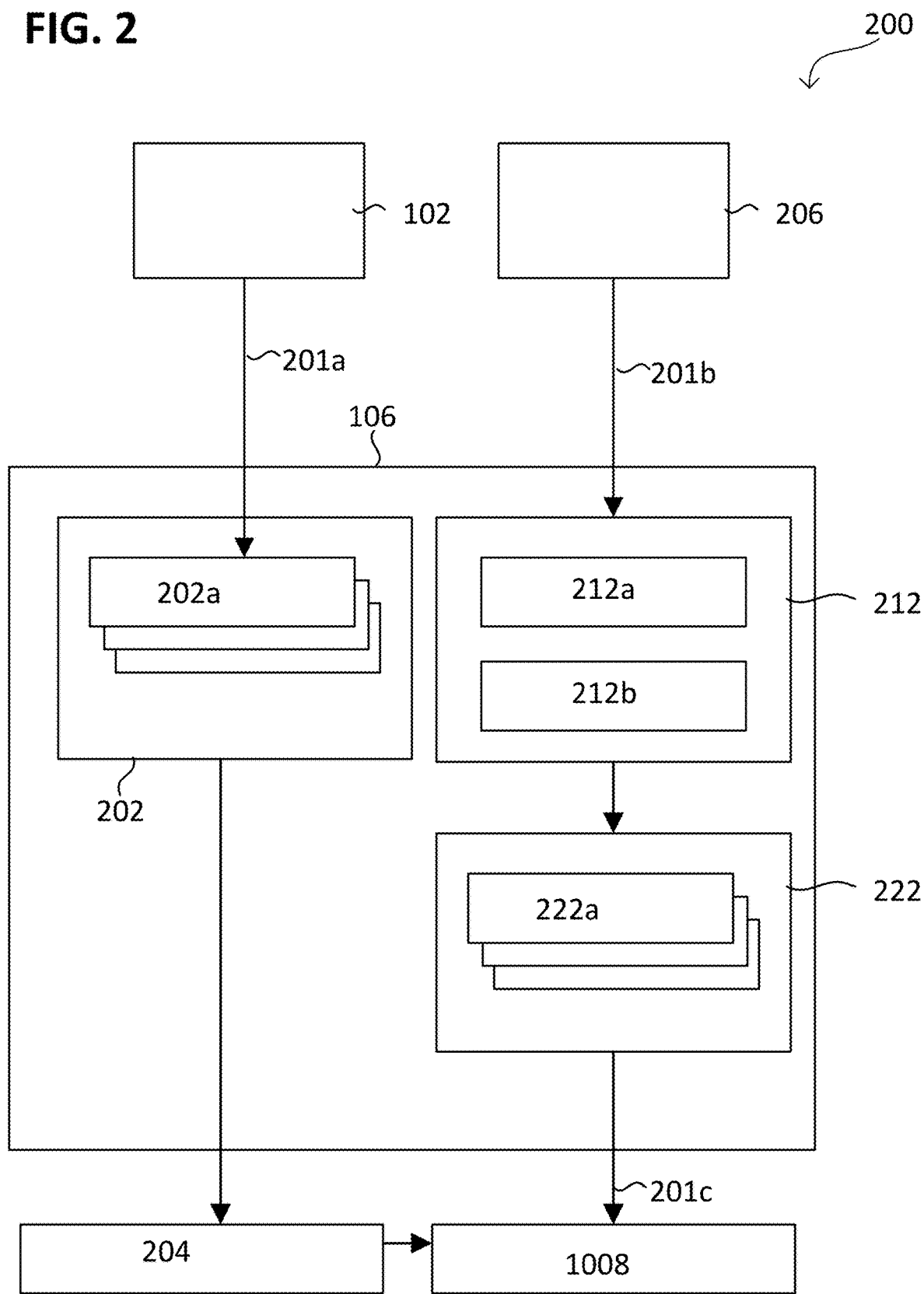

FIG. 2 illustrates a self-service terminal 100 according to various aspects 200 in a schematic diagram.

The control device 106 may receive an electrical signal 201a from the product scanning device 102 (if present) representing the product information of a product scanned by the product scanning device 102 (also referred as to scanned product). The control device 106 may be configured to determine purchase information 202a based on the product information (also referred to as registering a product). For each scanned product, the purchase information 202a, . . . , 202n may be determined and added to a list 202 of products.

The control device 106 may be further configured to determine payment information 204 based on the purchase information (e.g., the list 202 of products), e.g., considering the number of products and/or the amount to be paid for each of the products. Illustratively, the payment information 204 may represent the total amount to be paid for the products as registered by the self-service terminal 100.

For example, a product may have a product information medium to be scanned by the product scanning device 102, for example, such as a barcode and/or a RFID-tag. The product information medium may include product information allocated to the product, e.g., by a product database. Examples of the product information may represent a product identifier, a product type, or a product price. The control device 106 may interrogate a product database based on the product information and may determine the purchase information 202a based on the product database. Illustratively, a product database may include various information about products offered by the market. An exemplarily product database may allocate, for each of the products, the product identification to the purchase information. The product database may be stored by a storage medium (also referred to as database storage), e.g., internally of the self-service terminal 100 or externally from the self-service terminal 100.

The control device 106 may be configured to instruct the UI 1008 to output (e.g., display) the payment information 204. For example, a graphical UI 1008 may be instructed to display the payment information 204. Additionally or alternatively, control device 106 may be configured to instruct the UI 1008 to output purchase information 202a or the list 202 of registered products.

The control device 106 may receive an electrical signal 201b from the sensing device 206 representing the information about the user. The control device 106 may be configured to determine the physiological condition 212 of the user based on the information about the user. For example, the control device 106 may determine the first class 212a (e.g., in the default case 212a) or the second class (e.g., in the reconfiguration case 212b) as physiological condition 212 of the user.

The control device 106 may be configured to select an interface profile 222a (also referred to as selected interface profile 222*a*) from a plurality 222 of predefined (e.g., saved) interface profiles based on the physiological condition 212. The plurality 222 of predefined interface profiles may be stored by a storage medium (also referred to as profile storage), e.g., internally of the self-service terminal 100 or externally from the self-service terminal 100.

According to various aspects, the profile storage and/or database storage may be part of the control device 106. Additionally or alternatively, the profile storage and/or database storage may be externally from the control device 106, e.g., being part of a server externally from the control device 106 (e.g., a cloud storage). For example, multiple self-service terminals 100 may have access to the same profile storage and/or database storage.

As example, the control device 106 may interrogate a profile database based on the physiological condition 212 and may determine the selected interface profile 222*a* based on the profile database. Additionally or alternatively, the interrogation may be based on data received via the UI 1008, e.g., as described in more detail herein.

The control device 106 may be configured to instruct a reconfiguration of the UI 1008 based on the selected interface profile 222*a*. In other words, the control device 106 may be configured to generate an instruction 201*c* indicating the reconfiguration of the UI 1008.

The payment information 204 may be output by the UI 1008 being configured in accordance with the selected interface profile 222*a*. Additionally or alternatively, the user may interact with the UI 1008 being configured in accordance with the selected interface profile 222*a*.

According to various aspects, the instructions generated by the control device 106 may be generated in accordance with a communication protocol, e.g., a controller area network (CAN) communication protocol. For example, the instruction may be implemented by one or more messages that are communicated accordance with the communication protocol.

Figure 3:
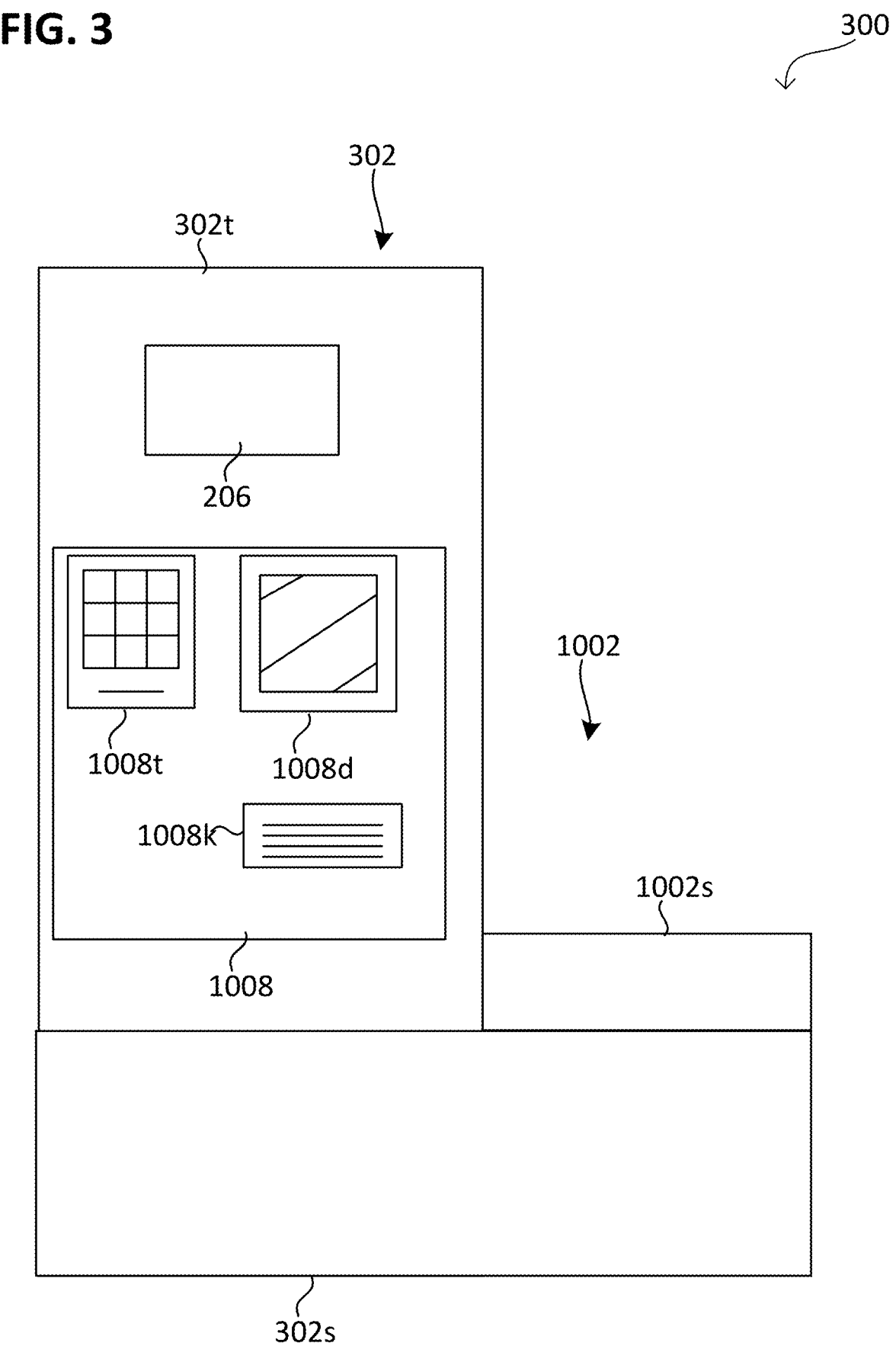
FIG. 3 shows the self-service terminal according to various aspects in a schematic view.

FIG. 3 illustrates a self-service terminal 100 according to various aspects 300 in a schematic view.

The self-service terminal 100 may include a body 302, e.g., including a housing, a power plug, a stand 302*s* and the like. Certain (e.g., electronic) components of the self-service terminal 100 may be hold by and/or attached to the body 302, for example, the product scanning device 102 (if present), the UI 1008 and/or the sensing device 206. For example, the UI 1008 and/or the sensing device 206 may be hold by and/or attached to a tower 302*t* of the body 302.

The UI 1008 may include at least one input device and/or at least one output device. The input device may be configured to receive a user input, e.g., one or more instructions of the user and/or one or more confirmations of the user. The output device may be configured to output a user recognizable information, e.g., acoustically and/or graphically (that is via audio and/or sound).

For example, the UI 1008 may include or be formed from a display device 1008*d* (e.g., including one or more screens) implementing the output device and optionally implementing the input device (e.g., via touch). For example, the user interface device 1008 may include a touch screen as input/output (I/O) device and/or one or more physical keys as input device, and/or a keyboard 1008*k* as input device. Optionally, the keyboard 1008*k* may be implemented by the touch screen of the display device 1008*d*.

The UI 1008 may optionally include a financial transaction device 1008*t* (e.g., in case of a self-checkout terminal 100 or a banking terminal 100), that may be used for one or more financial transactions. For example, the financial transaction device 1008*t* may include a card reading device configured to receive a banking card and to read banking account information from the banking card. Additionally or alternatively, the card reading device may be configured to read banking account information via NFC, e.g., from a mobile device and/or the banking card.

The display device 1008*d* (e.g., its graphical user interface 1008*d*) may be used to display information based on the interaction with the user (for example, self-checkout information, and/or financial transaction information). The self-checkout information may include a representation of the payment information, e.g., a (searchable or editable) virtual bill. The financial transaction information may include a representation of the financial transaction, e.g., an acknowledgement.

The financial transaction device 1008*t* may, for example, include at least one verification device configured to receive a verification input that associates the banking card with the customer. Of course, other payment forms may be used additionally or alternatively to the banking card. Examples for a payment form may include a debit card, a debit account, a credit card, a credit account, or money.

Optionally, the financial transaction device 1008*t* may, for example, include other components that enable to conduct the financial transaction, e.g., a secure data interface for transmitting secured data regarding the financial transaction. For example, the secure data interface may communicate with a banking server.

Optionally, the financial transaction device 1008*t* may further include a printer of the UI 1008 to print a bill including a representation of the conducted financial transaction, e.g., details thereof and/or a summary thereof.

Optionally, the self-checkout terminal 100 (e.g., in case of a self-checkout terminal 100) may include a deposition area 1002. The deposition area 1002 may include a safety sensor device 1002*s* (also referred as to safety sensor device 1002*s*), which is used to monitor the self-scanning procedure performed by the customer. Illustratively, the safety sensor device 1002*s* is used to detect fraudulent activity during the self-scanning procedure. For example, the safety sensor device 1002*s* may include a scale (also referred as to safety scale) or another type of sensor.

Figure 4:
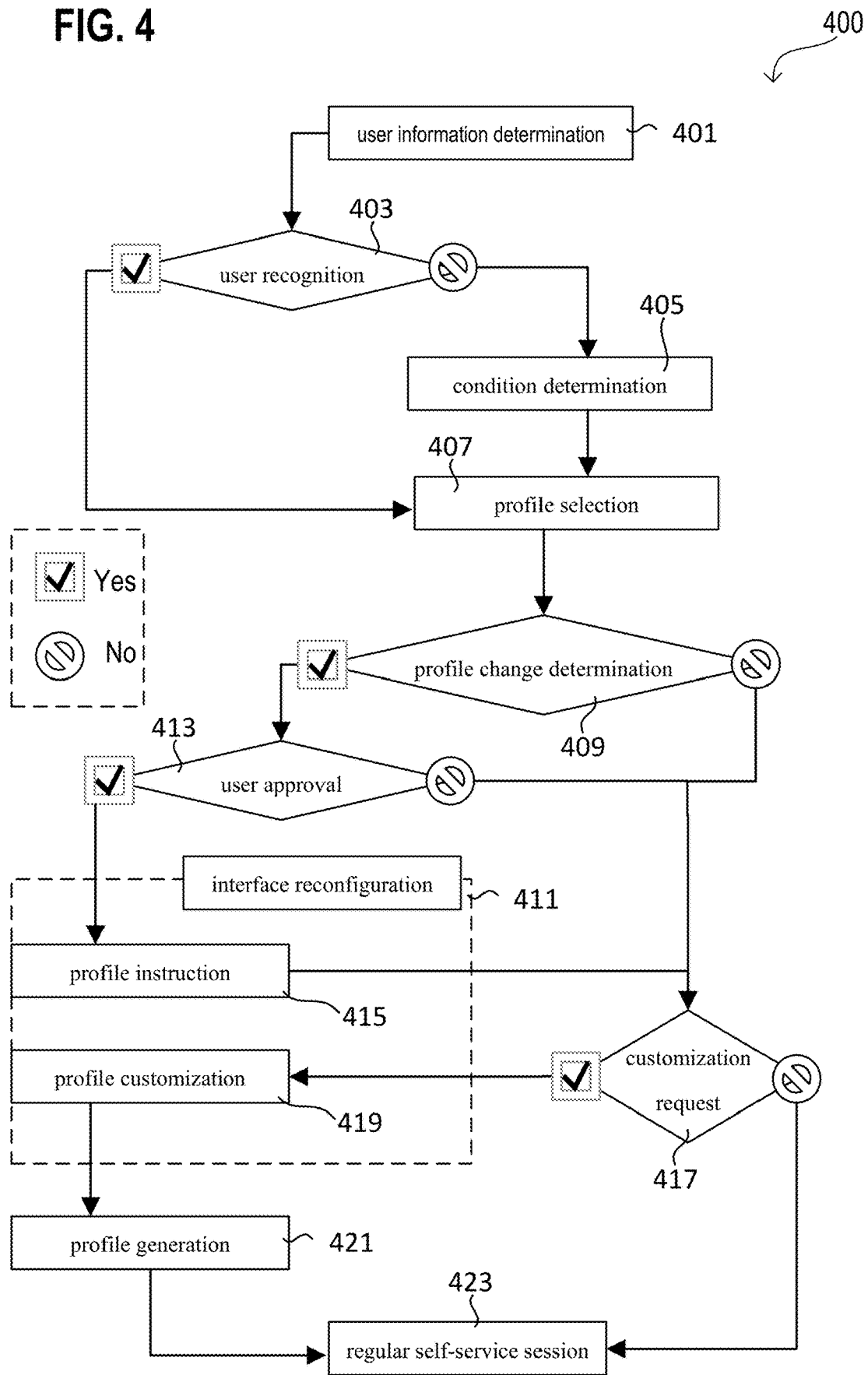
FIG. 4 shows a method according to various aspects in a schematic flow diagram.

FIG. 4 illustrates a method 400 in a schematic flow diagram for operating the self-checkout terminal 100 according to various aspects. The method 400 for operating the self-checkout terminal may be implemented by the control device 106. The interaction with the customer, e.g., receiving an input and/or displaying information, as described in the following, may be performed by the UI 1008, e.g., one or more graphical output devices 1008*d* and/or one or more graphical input devices 1008*d* of the UI 1008.

In 401 (also referred to as user information determination), the user information may be sensed by the self-service terminal 100, e.g., by the sensing device 206. Examples of the user information may include biometric data, e.g., read from a document of the user. Examples of the user information may include image data representing the user.

As example, sensing the user information may be triggered, e.g., by determining a user at the self-service terminal 100 (e.g., represented by a user input and/or based on the presence of a user in front of the self-service terminal 100). For example, the customer may initiate the user information determination by touching the user interface 1008, e.g., a touch screen thereof.

In 403 (also referred to as user recognition), it may be determined, whether the user information is assigned to an interface profile of the plurality 222 of predefined interface profiles (also referred to as customized interface profile or assigned interface profile). In other words, it may be determined, whether an interface profile is already allocated to the user information (e.g., being known to the self-service terminal 100).

For example, the user recognition 403 may be based on a face recognition, voice recognition, or the like. Additionally or alternatively, the user recognition 403 may be based on impersonalized user information, e.g., a user height, the document, and the like.

For example, the user recognition 403 allows for the identification of know users and/or at least known user information. Illustratively, the customized interface profile may be selected, each time of sensing a particular user information.

As example, each document of type "A" may have the same user information of type "A" (e.g., representing blindness as physiological condition). Multiple users may own a document of type "A", allowing each of the users to reconfigure the UI 1008 based on interface profile of type "A" by presenting the document of type "A".

As further example, multiple users may have a similar physiological condition "B", which leads to the same user information of type "B" (e.g., the presence of a wheel chair as user information). Thus, each user of physiological condition "B" may interact via the UI 1008 being configured based on interface profile of type "B".

It is noted that the user recognition 403 is an optional component. Thus, the user recognition 403 may be performed or not.

In 405 (also referred to as condition determination), the physiological condition of the user may be determined based on the user information.

If the user recognition 403 is performed, the performance of the condition determination 405 may be based on a result of the user recognition 403. For example, the condition determination 405 may be performed (e.g., only) if the result of the user recognition 403 is negative. Additionally or alternatively, the condition determination 405 may be omitted (e.g., only) if the result of the user recognition 403 is positive.

If the user recognition 403 is omitted, the condition determination 405 may be performed unconditionally.

In 407 (also referred to as profile selection), an interface profile may be selected from a plurality of predefined (e.g., saved) interface profiles.

If the condition determination 405 was performed, the profile selection may be based on the determined physiological condition as result of the condition determination 405. When a result of the user recognition 403 was positive (that is, if the user information are assigned to an interface profile), the interface profile to which the user information are assigned is selected.

In 409 (also referred to as profile change determination), it is determined, whether the selected interface differs from the interface profile currently applied to the UI 1008. Illustratively, it is determined, whether a reconfiguration of the UI 1008 is required.

In 411 (also referred to as interface reconfiguration), a reconfiguration of the user interface is instructed, e.g., (only) if the result of the profile change determination is positive (that is, the selected interface differs from the interface profile currently applied to the UI 1008). For example, the interface reconfiguration may be omitted, if the result of the profile change determination is negative (that is, the selected interface differs from the interface profile currently applied to the UI 1008).

In the reconfiguration case as example, the selected interface profile may be different from the interface profile currently applied to the UI 1008 (also referred to as default interface profile). As result, the interface profile may be changed. In the default case as example, the selected interface profile may be identical to the interface profile currently applied to the UI 1008. As result, the default interface profile may be maintained.

If the result of the profile change determination is positive, the interface reconfiguration 411 may be performed based on the selected profile in 415 (also referred to as profile instruction).

Optionally, the interface reconfiguration may be based on a user input, e.g., in 413 (also referred to as user approval) on a user approval received via the UI 1008. In this case, the user approval may be requested via the UI 1008 (e.g., acoustically, and/or graphically). If the requested user approval is received (e.g., by a user input), the interface reconfiguration 411 may be performed based on the selected profile in 415 (also referred to as profile instruction). If the requested user approval is rejected (e.g., by time out and/or by user input), the profile instruction 415 may be omitted. This implements a user feedback regarding the intended interface reconfiguration based on the selected interface profile. For example, the user may reject any reconfiguration of the UI 1008, if the actual configuration fits the needs of the user or if the user intends to perform a customization of the UI 1008.

Optionally, the interface reconfiguration 411 may be based on a user input, e.g., in 417 (also referred to as customization request) on a user customization received via the UI 1008. In this case, the user customization may be but not need to be requested via the UI 1008 (e.g., acoustically, and/or graphically). In 419 (also referred to as profile customization), the interface reconfiguration may be performed based on the user customization, if the user customization is received. If the requested user customization is rejected (e.g., by time out and/or by user input), the profile customization 419 may be omitted. This allows a user to customize the UI 1008. For example, the user may reconfigure the UI 1008 to better fit the actual needs of the user. As exemplarily implementation, the user may be offered in 417 by the self-service terminal 100 with a reconfiguration of the UI 1008, and if the user indicates approval, the self-service terminal 100 may guide the user through potential reconfigurations (e.g., by a dialogue).

Optionally, sensing the user information 401 may include sensing an input (also referred to as condition input) about the physiological condition of the user received via the UI 1008. In this case, the condition input may be but not need to be requested via the UI 1008 (e.g., acoustically, and/or graphically). When the condition input is received, the condition determination 405 may be further based on the condition input as part of the user information. This implements the option for the user to provide a more detailed basis for the condition determination 405 and improves the profile selection 407. For example, the user may provide information to better fit the actual needs of the user. As exemplarily implementation, the user may be offered by the self-service terminal 100 with the possibility to provide the condition input, and if the user indicates approval, the self-service terminal 100 may guide the user through potential physiological conditions (e.g., by a dialogue).

It may be understood that the request for a user input (e.g., in 413, and/or in 417) may be visible, tactile, and/or auditory.

Optionally, in 421 (also referred to as profile generation), an interface profile (also referred to as customized interface profile) may be generated based on the result of the interface reconfiguration, as result of the profile customization 419. To generate the customized interface profile, the self-service terminal 100 may present an interface profiling routine (e.g., by a dialogue). The interface profiling routine may guide the user through multiple options for reconfigurations (that is potential reconfigurations) of the UI 1008.

The customized interface profile may be assigned to the user information as determined in 401. The customized interface profile may be added to the plurality of predefined interface profiles. This allows for a user customized interface profiles to be stored for a later reuse, e.g., in case the user information as assigned to the customized interface profile is sensed in the future in 401. The customized interface profile may be determined in 403, when the user information of the user is sensed in the future.

In response to the interface reconfiguration and/or the negative result (e.g., rejection) of the customization request 417, the regular self-service operation 423 may be initiated. Examples of the self-service operation 423 may include: a self-checkout session, a self-scanning procedure, a self-banking session (e.g., at an ATM), self-retail session, and the like.

During the self-service operation 423, the UI 1008 may be configured in accordance with the result of the interface reconfiguration 411. Optionally, ending the self-service operation 423 may trigger another reconfiguration of the UI 1008, e.g., based on the default interface profile. For example, the UI 1008 may be configured based on the default interface profile when or before the user information determination 401 is initiated, e.g., when a self-service session is completed. For example, the UI 1008 may be reset to the default interface profile before the next user information determination 401 is be initiated and/or after the self-service session is completed.

An exemplarily self-checkout session may include: monitoring, if a product is scanned by the scanning device 102. Every time, a product is scanned by the scanning device 102, the purchase information 202a for the product is added to a product list based on the sensor data of the product scanning device 102. The exemplarily self-checkout session may further include: receiving an input representing a request to complete the self-checkout session (also referred as to ending request). When the ending request is received, the payment information 204 may be output and the financial transaction may be initiated by the user based on the payment information 204.

Figure 5:
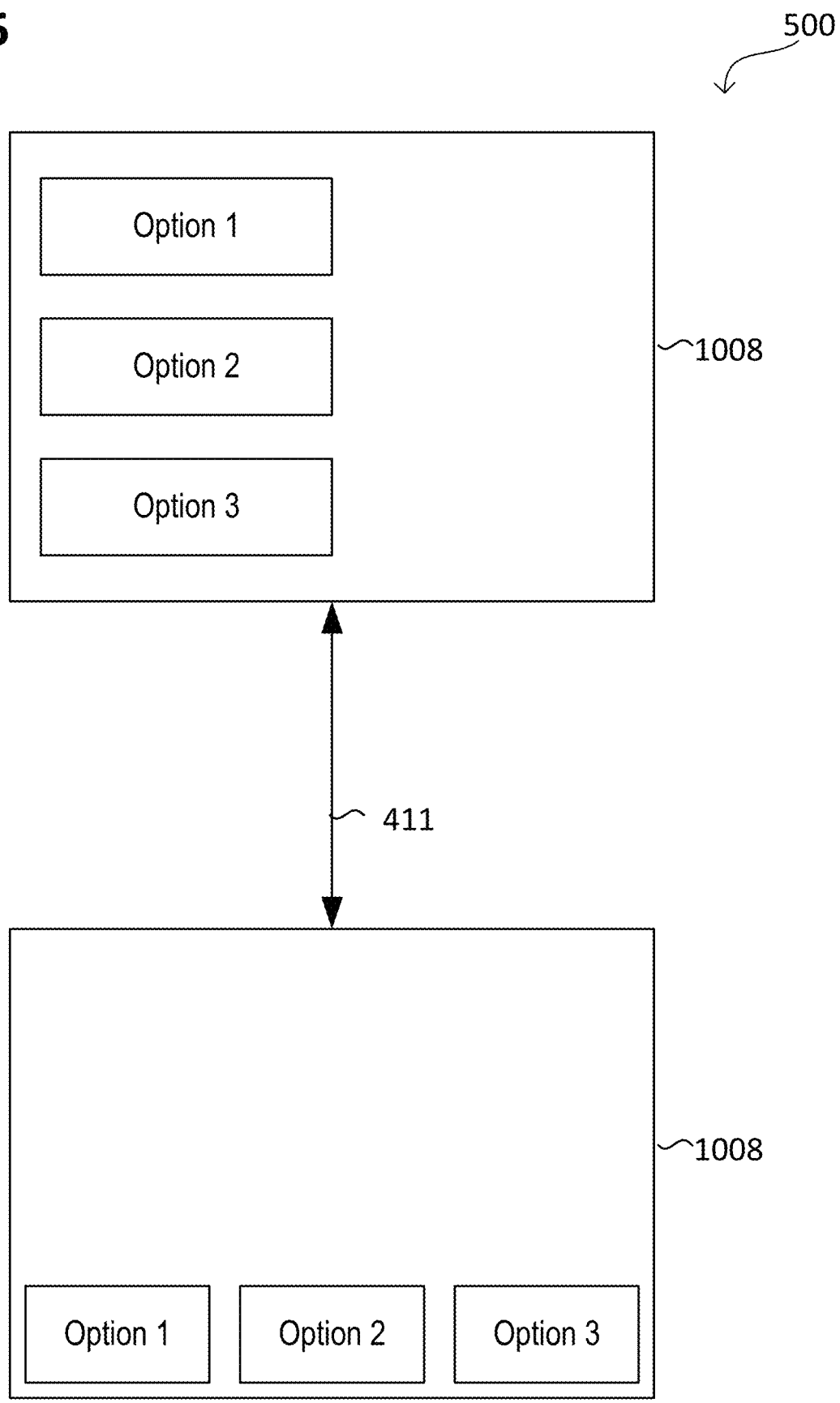
FIG. 5, FIG. 6, and FIG. 7 respectively show the user interface according to various aspects in a schematic diagram.

FIG. 5 illustrates the reconfiguration 411 of the UI 1008 (e.g., its display device 1008d) according to various aspects 500 in a schematic diagram. The reconfiguration 411 of the UI 1008 may include a rearrangement of a graphical user interface of the UI 1008.

The graphical user interface may implement an input device of the UI 1008, e.g., by a touch screen of the display device 1008d. The graphical user interface may include one or more graphical input components, e.g., soft button or the like. Each of the graphical input components may represent a certain option (here option 1 to 3) for operating the self-service terminal 100. The user may interact with the UI 1008 by pressing and/or touching the graphical input component, e.g., thereby selecting one of options 1 to 3.

In a first exemplarily scenario, the determined physiological condition of the user may represent that the accessibility of the user is limited in height. For example, the user of the first exemplarily scenario may be a young person or a growth-restricted person (also referred to as short stature). Alternatively, the user of the first exemplarily scenario may be in usage of a wheelchair. This physiological condition may be determined based on the position of the face of the user over ground. The position over ground may be determined based on image data of the user. Additionally or alternatively, the physiological condition representing the usage of the wheelchair may be determined based on object recognition. Based on the physiological condition, an interface profile may be selected that implements relevant graphical input components at the bottom of the display device 1008d, e.g., at its lowest screen.

Figure 6:
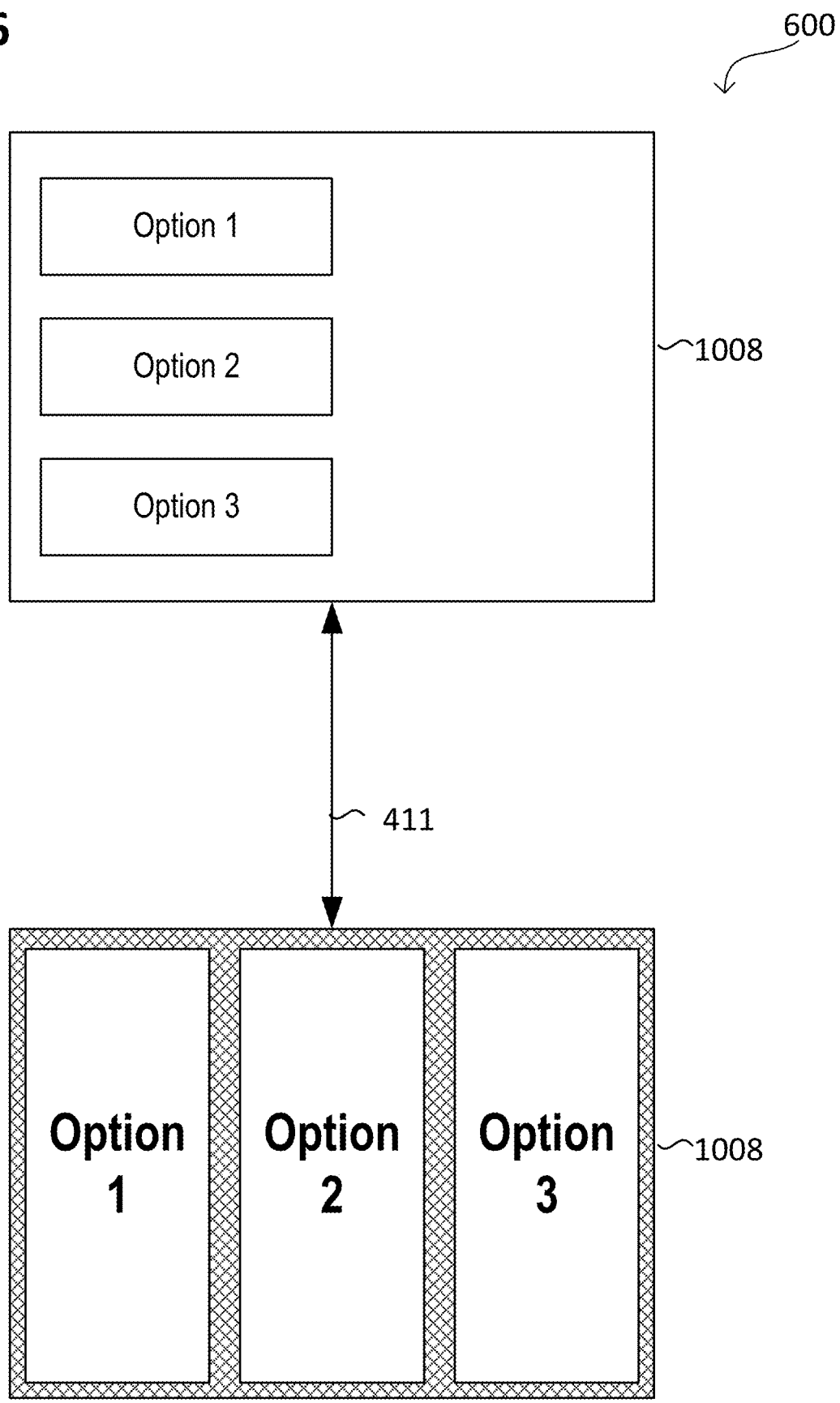

FIG. 6 illustrates the reconfiguration 411 of the UI 1008 (e.g., its display device 1008d) according to various aspects 600 in a schematic diagram. The interface reconfiguration 411 may include resizing and/or reshaping the graphical input components, resizing and/or reshaping labels of the graphical input components and/or a color adjustment of the graphical input components.

In a second exemplarily scenario, the determined physiological condition of the user may represent an impaired vision of the user. For example, the user of the second exemplarily scenario may be an elderly person or a temporary injured. This physiological condition may be determined based on reading from a document that the vision of the user is impaired. Based on the physiological condition, an interface profile may be selected that implements enlarged graphical input components distributed evenly over the display device 1008d, e.g., over its screen(s). Additionally or alternatively, an interface profile may be selected that implements higher contrast and/or higher brightness of the display device 1008d as an example of color adjustments.

Figure 7:
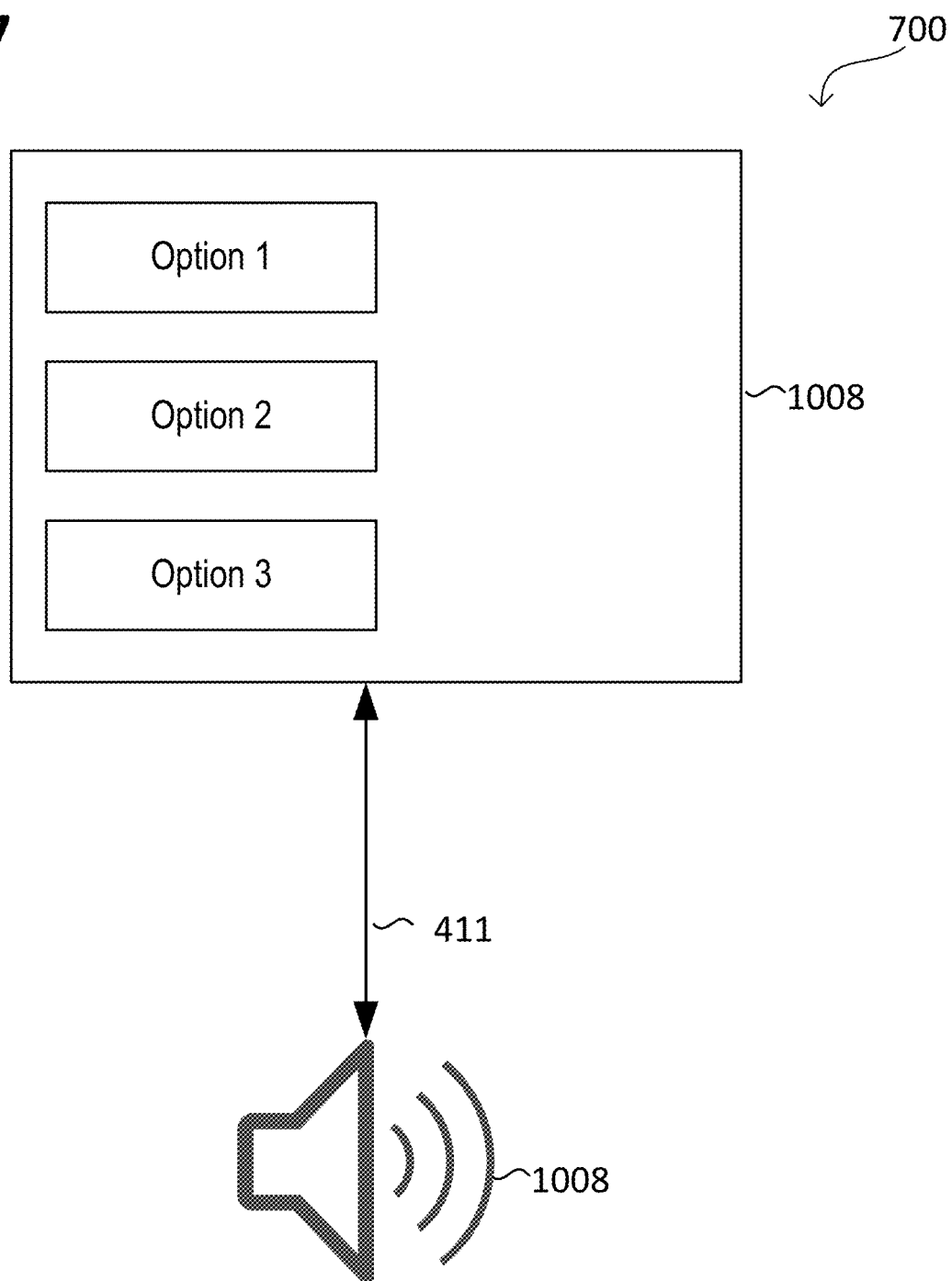

FIG. 7 illustrates the reconfiguration 411 of the UI 1008 (e.g., its display device 1008d) according to various aspects 700 in a schematic diagram. The interface reconfiguration 411 may include activating non-visible (e.g., the tactile and/or auditory) interaction devices of the user interface. For example, the graphical operation components (e.g., option 1 to 3) may be also represented by a voice output.

In a third exemplarily scenario, the determined physiological condition of the user may represent blindness. This physiological condition may be determined based on reading from a document that the user is blind. Additionally or alternatively, this physiological condition may be determined based on image data of the user. For example, a white cane and/or a symbol (e.g., three black dots on yellow ground) may be determined based in the image data. Based on the physiological condition, an interface profile may be selected that activates the tactile UI 1008 and/or the auditory UI (interacting via sound, e.g., voice). For example, the graphically presented options 1 to 3 may be presented via sound, e.g., voice, and/or via braille.

In a fourth exemplarily scenario, the physiological condition of the user may be determined as impaired mobility. This physiological condition may be determined based on reading from a document the information that the user is impaired in the mobility. Additionally or alternatively, this physiological condition may be determined based on image data of the user. For example, prosthetics and/or amputations may be determined based in the image data. Based on the physiological condition, an interface profile may be selected that activates the auditory UI (interacting via sound, e.g., voice). For example, the graphically presented options 1 to 3 may be presented via sound, e.g., voice, e.g., as voice dialogue (also referred to as conversation).

Figure 8:
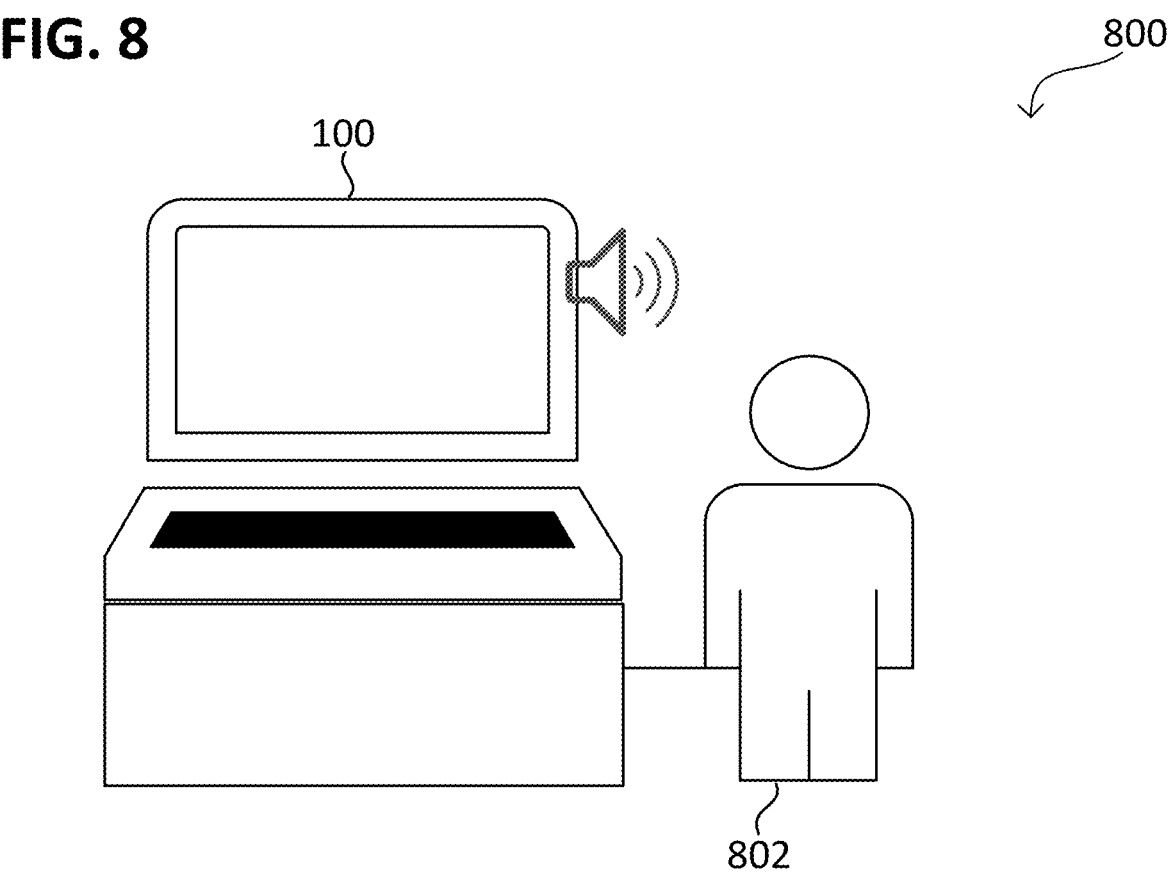
FIG. 8 shows the self-service terminal according to various aspects in a schematic view.

FIG. 8 illustrates the self-service terminal 100 according to various aspects 800 in a schematic view. Sensing the user information 401 may include receiving a user input (also referred to as condition input) received via the UI 1008.

In a fifth exemplarily scenario, the self-service terminal 100 may recognize the presence of a user at the self-service terminal 100 but no input. After a timeout, the self-service terminal 100 may offer assistance with its operation, e.g., via the auditory UI (interacting via sound, e.g., voice) and/or via the visual UI. If the user approves the offer, e.g., via voice, the self-service terminal 100 may interrogate the user about the user's physiological condition (e.g., based on voice).

Additionally or alternatively, the self-service terminal 100 may send a message to request an employee as assistance for the user in response to recognizing the presence of a user at the self-service terminal 100 but no input.

In a sixth exemplarily scenario, the self-service terminal 100 may send a message to request an employee as assistance for the user, if the selected interface profile indicates so. Illustratively, this implements an UI 1008 that is specifically configured to be assisted by the employee.

Figure 9:
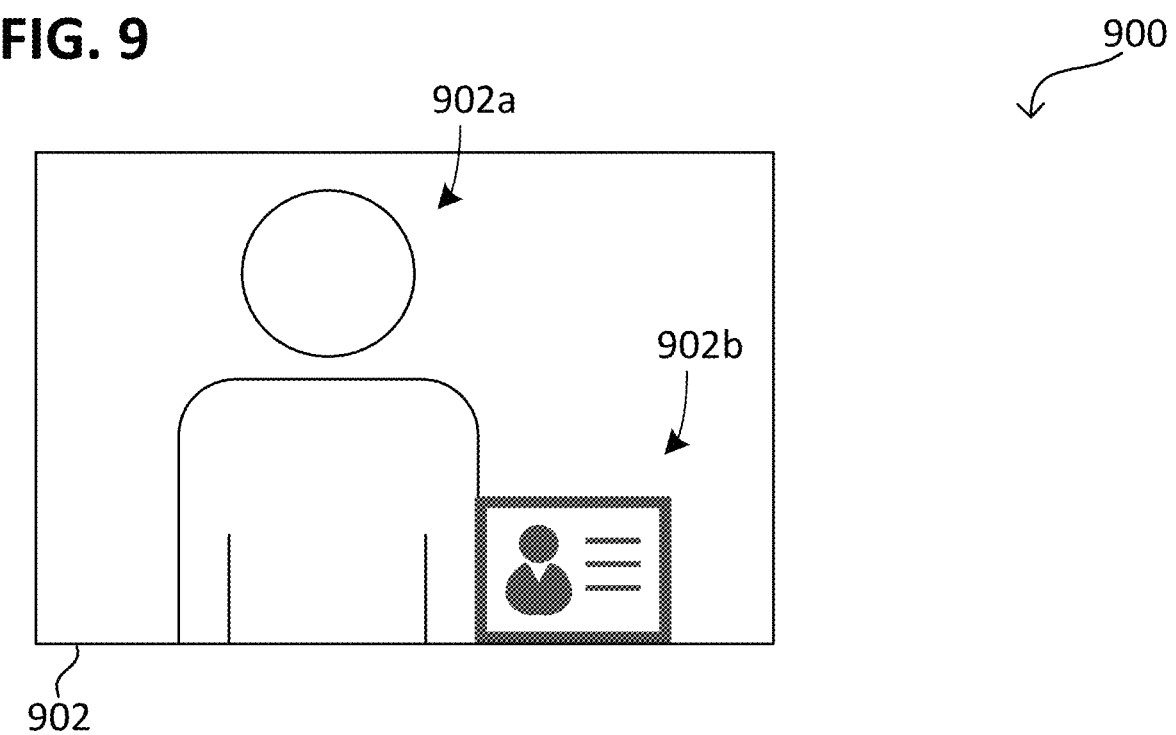
FIG. 9 shows image data obtained by the self-service terminal according to various aspects in a schematic view.

FIG. 9 illustrates the image data 900 obtained by the self-service terminal 100 according to various aspects in a schematic view as an example for the user information determination 401. The sensing device 206 may include one or more cameras that provide image data 902. When the user presents the document to the one or more cameras that provide image data 902 of the user, the image data 902 may represent the document. Generally, the image data 902 may represent the user and/or represent the document.

The control device 106 may be configured to determine the physiological condition based on image details 902a of the image data that represent the user and/or based on image details 902b of the image data (if present) that represent the document. Optionally, the document may include a machine-readable code representing the physiological condition of the user. Additionally or alternatively, the document may include text representing the physiological condition of the user (e.g., one or more letters).

The process of determining a physiological condition of the user based on the information may be implemented by one or more algorithms. For example, the document may be read out via optical character recognition (OCR) and/or via algorithms using a histogram of oriented gradients (HoG). The histogram of oriented gradients (HOG) is a feature descriptor used in computer vision and image processing for the purpose of object detection. An exemplarily implementation of face recognition and localization may also include HoG and, additionally or alternatively, a Recurrent Convolutional Neural Network (RCNN). An exemplarily implementation of a more general object recognition (e.g., for the wheelchair, blind-arm bandage, or the like) may include one or more RCNNs, which may be trained based on image data including persons having the object to be recognized (e.g., the wheelchair, blind-arm bandage, or the like). The object to be recognized may be chosen such that it represents the physiological condition of the user. The one or more RCNNs may but not need to be prototypically implemented. An exemplarily implementation of the recognition of an amputation (e.g., missing limbs) or a limited movement possibility may include one or more algorithms from the field of Human Body Posture Recognition (e.g. Joint Angle Representation). Algorithms from the field of Human Body Posture Recognition may preferably use three-dimensional image data, e.g., provided by a 3D-camera of the sensing device. An exemplarily implementation of the recognition of operating problems may include one or more algorithms (e.g., based on Neural Networks) for the recognition of unusual operating patterns (e.g., indicative of the psychological condition of the user). For example, the user operating may be analyzed for deviations from normal behavior.

In the following, various examples are provided with reference to the aspects described above.

Example 1 is a self-service terminal, including: a user interface accessible to a user of the self-service terminal; a sensing device configured to sense information about the user; a control device configured to: determine a physiological condition of the user based on the information; select an interface profile from a plurality of predefined (e.g., saved) interface profiles based on the physiological condition; and instruct a reconfiguration of the user interface based on the selected interface profile.

Example 2 is the self-service terminal of example 1, further including: an automated teller machine (ATM) including the user interface, the ATM optionally being assigned to a financial institution, the ATM optionally implementing one or more of the following functions (e.g., operable via the user interface): a cash withdrawal, a deposit, a fund transfer (e.g., between two accounts), and/or an account information inquiry; the ATM optionally including a bank teller safe (also referred to as strongbox).

Example 3 is the self-service terminal of example 1 or 2, further including: a product scanning device configured to scan a product identifier of a product presented to the product sensing device; wherein the control device is further configured to output product information based on the product identifier via the user interface.

Example 4 is the self-service terminal of example 3, wherein the product information include purchase information assigned to the product identifier and/or payment information based on the purchase information.

Example 5 is the self-service terminal of any of examples 2 to 4, wherein the control device is further configured to initiate a purchase routine (e.g., via the user interface) based on an input at the user interface and based on the product information.

Example 6 is the self-service terminal of example 5, wherein the purchase routine includes a financial transaction (e.g., via the user interface) and/or wherein the purchase routine includes an acknowledgment about the financial transaction output (e.g., via the user interface).

Example 7 is the self-service terminal of any of examples 1 to 6, wherein the sensing device is configured to read the information from a document presented (e.g., by the user) to the sensing device.

Example 8 is the self-service terminal of any of examples 1 to 7, wherein the sensing device is configured to sense biometric information of the user as information.

Example 9 is the self-service terminal of any of examples 1 to 8, further including: a memory storing the plurality of predetermined interface profiles.

Example 10 is the self-service terminal of any of examples 1 to 9, further including: a network transceiver, wherein the control device is configured to request and/or update the plurality of predetermined interface profiles via the network transceiver (e.g., according to a network protocol).

Example 11 is the self-service terminal of any of examples 1 to 10, wherein the reconfiguration includes a rearrangement of a graphical user interface of the user interface.

Example 12 is the self-service terminal of example 11, wherein the rearrangement of the graphical user interface includes a rearrangement of one or more graphical input components (e.g., soft keys) of the graphical user interface.

Example 13 is the self-service terminal of any of examples 1 to 12, wherein the reconfiguration includes an activation of a voice user interface (e.g., voice based user interface) of the user interface.

Example 14 is the self-service terminal of any of examples 1 to 13, wherein the selected interface profile is assigned to the physiological condition.

Example 15 is the self-service terminal of any of examples 1 to 14, wherein the physiological condition represents that the user is a wheelchair user.

Example 16 is the self-service terminal of any of examples 1 to 15, wherein the control device is further configured to generate a further interface profile based on an input at the user interface (e.g., via an interface profiling routine), and assign the further interface profile to the information (e.g., to the biometric information of the user).

Example 17 is the self-service terminal of example 16, wherein the control device is further configured to determine the further interface as selected interface profile, when the information is sensed.

Example 18 is the self-service terminal of example 17, wherein the physiological condition is determined based on the information, (e.g., only) if no interface profile is assigned to the information.

Example 19 is the self-service terminal of any of examples 1 to 18, wherein the control device is configured to determine the physiological condition further based on a user input.

Example 20 is the self-service terminal of any of examples 1 to 19, wherein the control device is configured to instruct the reconfiguration of the user interface based on the selected interface profile, (e.g., only) if the reconfiguration is confirmed via the user interface.

Example 21 is the self-service terminal of any of examples 1 to 20, wherein the control device is configured to provide an interface profiling routine via the user interface to generate or update an interface profile.

Example 22 is a method, including: determining a physiological condition of a user of a self-service terminal based on information about the user sensed by the self-service terminal; selecting an interface profile from a plurality of predetermined interface profiles based on the physiological condition; instructing a reconfiguration of a user interface of the self-service terminal based on the selected interface profile.

Example 23 is a non-volatile computer-readable medium, including instructions (e.g. code segments), which, when executed by one or more processors, cause the processors to perform the method of example 22.

Example 24 is a controlling device, including one or more processors configured to perform the method of example 22, the controlling device optionally further configured in accordance with the control device of one of the examples 1 to 21.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A method of operating an automated teller machine comprising:
   positioning a user interface of the automated teller machine including a graphical user interface at a position accessible to a user of the automated teller machine;
   sensing, with a sensing device of the automated teller machine, information about the user;
   communicatively coupling a control device of the automated teller machine with the user interface and the sensing device;
   determining, with the control device, a physiological condition of the user based on the information;
   classifying, with the control device, the physiological condition;
   selecting, with the control device, an interface profile from a plurality of predefined interface profiles based on said classifying the physiological condition and related to the accessible position of the user interface of the automated teller machine;
   instructing, with the control device, an automatic reconfiguration of the user interface based on the interface profile selected during said selecting for accessibility of the user;
   modifying, with the control device, at least one input device of the automated teller machine;
   generating, with the control device, a further interface profile based on an input at the user interface;
   assigning, with the control device, the further interface profile to the information;
   determining, with the control device, the further interface as the selected interface profile, when the information is sensed; and
   wherein said determining the physiological condition based on the information is further defined as determining the physiological condition based on the information only when no interface profile is assigned to the information.

2. The method of claim 1 further comprising:
   scanning a product identifier with a product scanning device of the automated teller machine; and
   outputting, with the control device, product information based on the product identifier via the user interface.

3. The method of claim 1 wherein said sensing is further defined as:
   sensing, with the sensing device of the automated teller machine, biometric information of the user.

4. The method of claim 1 wherein said instructing is further defined as:
   instructing, with the control device, an automatic reconfiguration of the user interface based on the interface profile selected during said selecting for accessibility of the user wherein the automatic reconfiguration comprises a rearrangement of the graphical user interface of the user interface.

5. The method of claim 4 wherein said instructing is further defined as:
   instructing, with the control device, an automatic reconfiguration of the user interface based on the interface profile selected during said selecting for accessibility of the user wherein the automatic reconfiguration comprises a rearrangement of the graphical user interface of the user interface and wherein the rearrangement of the graphical user interface comprises a rearrangement of one or more graphical input components of the graphical user interface.

6. The method of claim 1 wherein said instructing is further defined as:

instructing, with the control device, an automatic reconfiguration of the user interface based on the interface profile selected during said selecting for accessibility of the user wherein the automatic reconfiguration comprises an activation of a voice user interface of the user interface.

7. The method of claim 1 further comprising:

assigning, with the control device, the selected interface profile to the physiological condition determined during said determining the physiological condition of the user based on the information.

8. The method of claim 1 wherein said determining the physiological condition of the user based on the information is further defined as:

determining, with the control device, the physiological condition of the user based on the information and wherein the physiological condition represents that the user is a wheelchair user.

\* \* \* \* \*